April 21, 1953 — E. COOK — 2,635,519
HYDRAULIC CONTROL SYSTEM
Filed May 9, 1947 — 3 Sheets-Sheet 1

INVENTOR:—
EINAR COOK
BY
ATTORNEYS

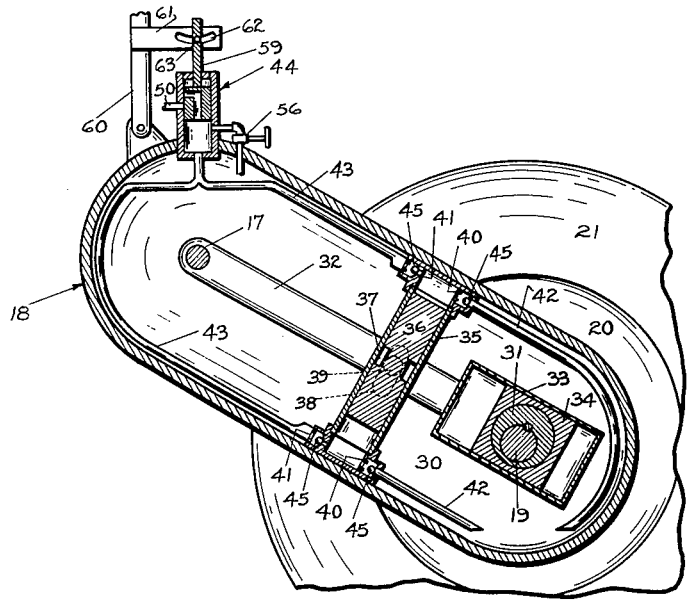
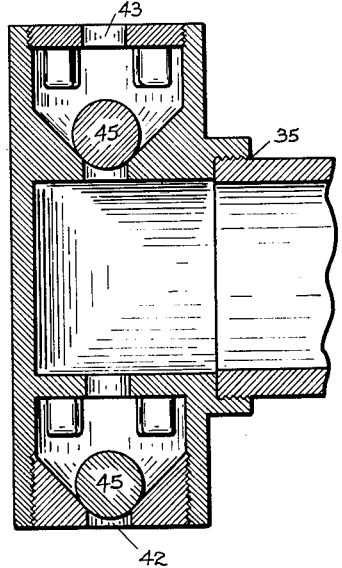
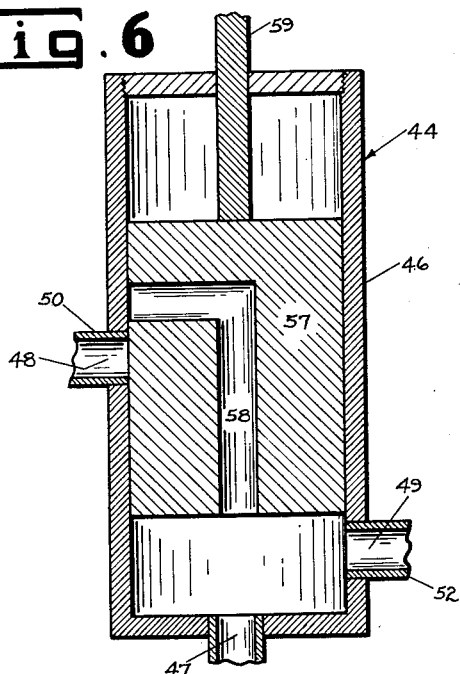
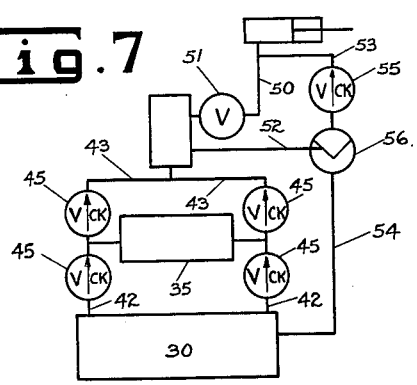
INVENTOR:-
EINAR COOK

April 21, 1953 — E. COOK — 2,635,519
HYDRAULIC CONTROL SYSTEM
Filed May 9, 1947 — 3 Sheets-Sheet 3

INVENTOR:—
EINAR COOK
BY
*Kuhner, Maltby & Buhler*
ATTORNEYS

Patented Apr. 21, 1953

2,635,519

UNITED STATES PATENT OFFICE 2,635,519

HYDRAULIC CONTROL SYSTEM

Einar Cook, Fresno, Calif.

Application May 9, 1947, Serial No. 747,076

3 Claims. (Cl. 97—50)

The present invention relates to hydraulic control systems and more particularly to such systems adapted for use in agricultural implements.

The advantages of hydraulic control systems in the control and manipulation of agricultural implements and other tools have been clearly established. Hydraulic control systems for scrapers, harrows, plows, subsoiling devices, and other tools have been productive of more efficient utilization of draft power applied to such tools, have provided increased convenience in the manipulation of the tools, and have proved useful adjuncts to the mechanization of farming. Conventionally, hydraulic implements derive their source of power, or hydraulic pressure, from a pump mounted on the draft appliance by which the implement is drawn, said pump being driven by a rotary shaft of said draft appliance. This has been inconvenient in that hydraulic lines must be connected and disconnected in engaging and disengaging various implements with the draft appliance. Not all tractors have provided rotary shafts adapted to drive hydraulic pumps. For these and other reasons the advantages of hydraulic control of agricultural implements have not been as great as possible and the advantages attained have not been available to farmers generally in that requisite extensive modification of existing equipment to hydraulic control has frequently been impossible, and where possible, in many instances prohibitively expensive.

An object of the present invention is therefore to make the advantages of hydraulic control systems for agricultural implements generally available.

Another object is to provide hydraulic control systems for agricultural implements independent of draft appliances by which the implements are drawn.

Another object of the present invention is to provide hydraulic control systems for agricultural implements having elements thereof rotated by rolling action over earth traversed by the implement.

Another object is to provide improved agricultural implements embodying hydraulic control systems energized by ground traversing movement of the implements.

Another object is to provide an improved, wheel borne, carry-all incorporating an hydraulic control system, energized by wheel rotation, adapted to controllably position earth working tools borne by the carry-all.

Further objects are to provide improved elements and arrangements thereof in hydraulic control systems of the character and for the purposes set forth.

Referring to the drawings:

Fig. 4 is a sectional view taken on line 4—4 of Fig. 3.

Fig. 5 is an enlarged fragmentary section of a valve system shown in Fig. 4.

Fig. 6 is a somewhat enlarged sectional view of the combined hydraulic control valve and emergency pump seen in Fig. 4.

Fig. 7 is a schematic view of the hydraulic control system of the first form of the present invention.

Figure 1:
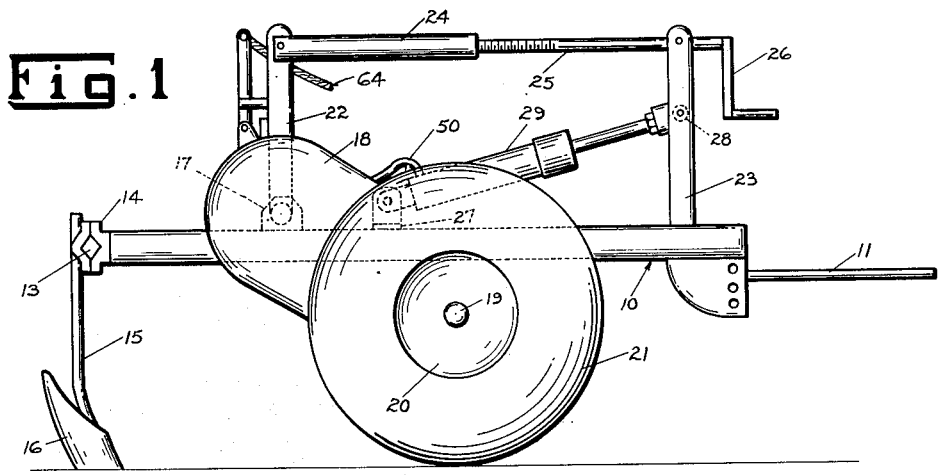
Fig. 1 is a side elevation of a carry-all embodying the principles of the present invention showing the elements thereof in operable position.
Figure 3:
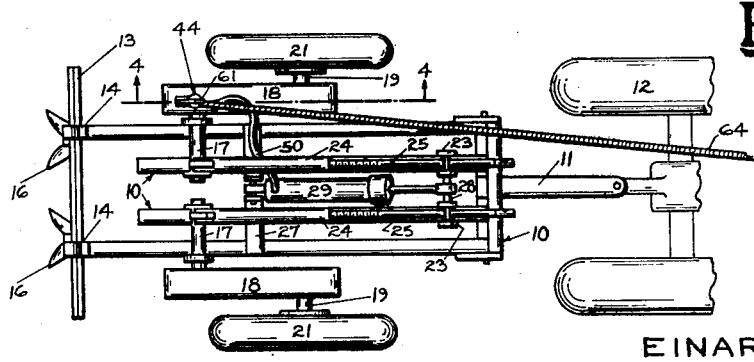
Fig. 3 is a plan view of the carry-all seen in Figs. 1 and 2 in engagement with a draft appliance fragmentarily illustrated.
Figure 8:
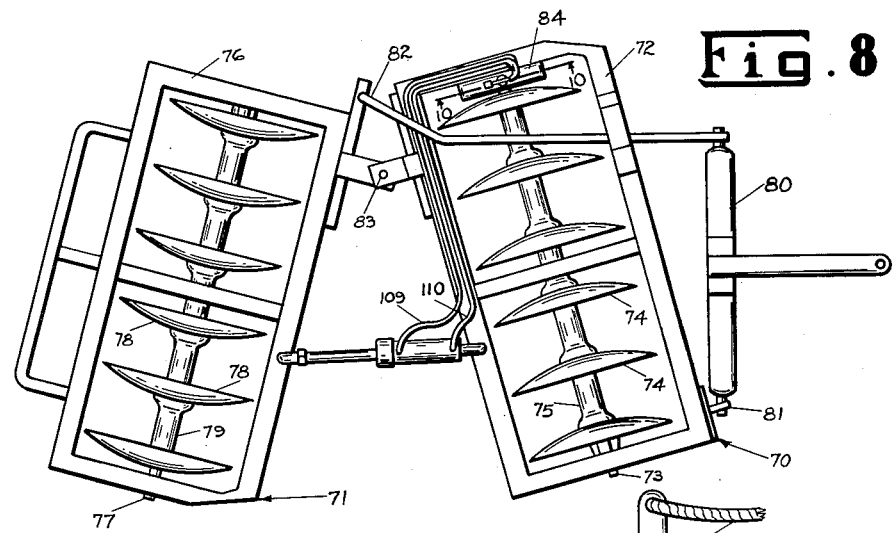
Fig. 8 is a plan view of a disc harrow embodying a hydraulic control system of the present invention.
Figure 9:
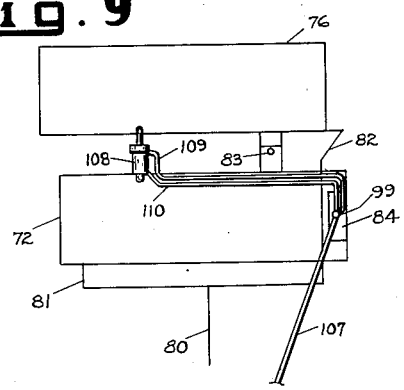
Fig. 9 is a diagrammatic view of the harrow seen in Fig. 8 indicating normally angularly related gangs thereof in closed relation.
Figure 10:
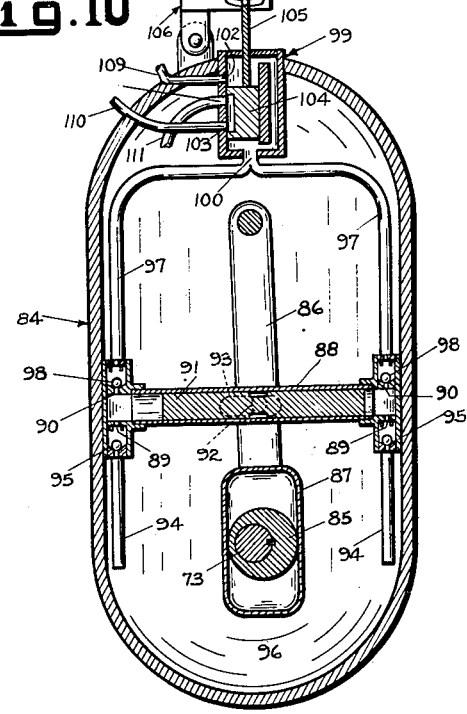
Fig. 10 is a sectional view taken on line 10—10 of Fig. 8.

Referring in greater detail to the drawings:

In Fig. 1, a draft frame is indicated generally at 10, having a draw bar 11 forwardly disposed for operational engagement by a draft appliance, such as the tractor 12 shown fragmentarily in Fig. 3. Rearwardly disposed the draft frame is tool bar 13 secured to the frame by clamps 14. Conventional tool shanks 15 and earth working tools 16 are secured to the tool bar in any convenient manner and downwardly disposed for soil engagement, as is well known in agricultural implements commonly referred to as tool carriers.

To the end of elevationally positioning the support frame and tools carried thereby, a pair of support shafts 17 are journaled in said frame and laterally extended therefrom. Support arms 18 are secured to the support shafts and extended forwardly and downwardly therefrom. The support arms comprise substantially fluid-tight, hollow housing of sufficient strength to bear the weight of the carry-all and earth working tools attached thereto. Stub axles 19 are journaled in the forwardly extended end portions of the support arms and laterally extended therefrom. Rotary earth engaging elements, such as the wheels 20 and tires 21, are secured to the stub axles 19 and so mounted provide support for the carry-all in ground traversing movement.

At this point, it will be clearly evident that the support frame may be raised and lowered relative to ground traversed by upward and downward pivotal movement of the support arms 18 on the shafts 17 of the support frame.

To the end of compelling said pivotal movement, crank levers 22 are secured to the support shafts, as by welding, and radially extended therefrom, preferably upwardly. Corresponding elements 23 are pivotally mounted in the frame 10 forward of the crank levers and upwardly extended. Telescopically adjustable elements interconnect the upwardly extended end portions of the crank levers and the upwardly extended end portions of the corresponding elements 23. The telescopically adjustable elements conveniently comprise a female threaded portion 24 pivotally connected to the crank levers, and male screw threaded portions 25 engaged in the female portions, rotatably mounted in fixed longitudinal position in the elements 23, and having a forwardly disposed crank 26 for convenience in rotating the male portion to extend or contract the adjustable elements at will.

Figure 2:
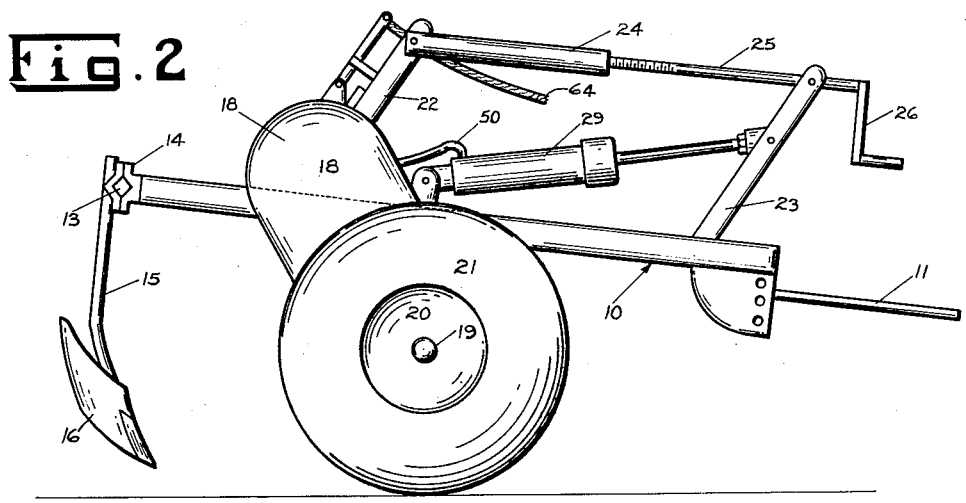
Fig. 2 is a side elevation of the carry-all seen in Fig. 1 showing elements thereof in the positions they assume when earth working tools borne by the carry-all are raised from the soil.

A cross member 27 is provided in the frame 10 rearward of the elements 23. A shaft 28 is connected between the elements 23 in a position radially extended from the pivotal mountings of said elements. An extensible and contractile hydraulic motor 29, more commonly referred to as a ram, interconnects the cross member 27 and the shaft 28. Inasmuch as the weight of the carry-all and earth working tools borne thereby tend to compress the ram, it has been found convenient to use a ram extensible by hydraulic pressure and contractable by said weight of the carry-all and supported load. Such rams employing hydraulic pressure for extension purposes only and rams employing hydraulic pressure for both extension and contraction are well known and not described in detail herein. Suffice it to say that they conventionally comprise a cylinder, a piston slidable therein, and means for supplying hydraulic fluid under pressure to either or both sides of the piston. It is to be noted that the present invention is not limited to any particular form but may employ any hydraulic motor or ram where intelligence, impressed on hydraulic fluid by controlling the pressure thereof, is translated into operational movement. As evident in Fig. 1, when the ram is permitted to contract, the crank levers move rearwardly, the support arms 18 are forwardly directed, the frame 10 lowered with respect to terrain encountered by the wheels 20—21, and the earth working tools 16 engaged in the earth. When the ram is extended, the opposite effect is accomplished resulting in the raising of the frame with respect to the wheels and the raising of the earth working tools from the earth, as seen in Fig. 2. Obviously, the extent of contraction or extension of the ram determines the elevation of the earth working tools according to predetermined telescopic adjustment of the male and female portions 24 and 25, respectively. The tipping of the frame as shown in Fig. 2 increases elevational effect on the earth working tools resulting from a given extension or contraction of the ram.

At this point, reference is appropriately made to the hydraulic system of this form of the present invention. In Fig. 4 the hollow interior of a support arm 18 and elements contained therein are illustrated. As previously stated the support arms are substantially fluid tight and thus conveniently contain a reservoir 30 of hydraulic fluid. A cam 31 is secured to the axle 19 inwardly disposed the hollow interior of the support arm. A pump lever 32 is pivotally mounted in the control arm, as by being received by an end of a support shaft 17, and is provided at an end thereof with a yoke 33 containing the cam. The yoke and the cam are preferably associated by providing a journal block 34, slidable in the yoke longitudinally of the pump lever, said journal block rotatably receiving the cam. Thus as the wheel 20 and tire 21 roll over the ground, the cam rotates, and imparts to the pump lever through the yoke, an oscillating pivotal movement.

A pump cylinder 35, having a longitudinal bore is mounted in the control arm 18 adjacent the pump lever 32 and generally transversely disposed said lever. A plunger 36 is slidably fitted to the bore and longitudinally reciprocated therein. The plunger is preferably provided with a circumscribing groove 37 intermediate its end portions. An elongated opening 38 is formed longitudinally in a wall of the pump cylinder, adjacent the pump rod, and in a position overlaid by the plunger during its preciprocal movements. A stud 39 is fixedly mounted on the pump lever, extended through the opening and engaged to the plunger by being received in the circumscribing groove 37 formed therein. Thus, it is apparent that as the pump rod is pivotally oscillated the plunger is reciprocally positioned in the pump cylinder. Inasmuch as it is desired to pump hydraulic fluid from the reservoir upwardly, intake ports 40 are preferably formed downwardly disposed at each end of the pump cylinder. Exhaust ports 41 are provided at each end of the cylinder in upwardly disposed positions. The intake parts are provided with intake conduits 42 extended into the reservoir 30 of the hydraulic fluid, as shown. The exhaust ports are provided with fluid supply conduits 43 in fluid communication with a combined control valve and emergency pump 44, presently more fully described. As detailed in Fig. 6 the intake and the exhaust ports are provided with check valves 45 permitting only a one way flow of fluid, upwardly from the reservoir and upwardly from the pump. The check valves are of well known structure and are not described in greater detail. As the plunger is reciprocally positioned in the cylinder, each stroke results in a drawing of fluid in at one intake port and the forcing of fluid out at the exhaust port on the opposite end of the cylinder. On the return stroke, the opposite intake and exhaust ports function. Hydraulic pumps of any suitable form may be employed without departing from the spirit or the scope of the present invention.

The combined control valve and emergency pump 44 is shown in cross section in Fig. 6. The combined valve and pump comprises a housing 46 having a cylindrical inner opening formed longitudinally intermediate the ends thereof, a fluid supply port 47 formed in an end thereof, a control port 48 formed through a side of the housing, and a by-pass port 49 also formed through the side of the housing. The control port and by-pass port are longitudinally spaced in the housing, the by-pass port preferably being near the end of the housing through which the supply port is formed. The supply conduits 43 unite and are connected in fluid communication with the supply port 47. A ram conduit 50 communicates between the control port 48 and the ram 29. The ram conduit is provided with a manually operated shut off valve 51. A bifurcated by-pass conduit 52 is connected at one end to the by-pass port 49, one branch 53 thereof being connected in fluid communication with the ram and the other branch 54 providing a return path for fluid to the reservoir. The branch 53 leading to the ram is provided with a check valve 55 precluding return flow of fluid from the ram through the by-pass conduit. A two-way valve 56 is provided at the intersection of the two branches of the by-pass conduit providing selection of alternate branches. A valve core 57 is slidably engaged in the cylindrical inner opening of the housing and has a passage 58 formed therethrough. One end of the passage is adapted to register with the control port 48 and the other end with the hollow interior of the housing. The valve member is of such a length in relation to the longitudinal spacing of the control port and the by-pass port that when slidably positioned longitudinally in the housing, said member closes one of the ports as it opens the other. Thus by longitudinal positioning of the valve core, control of the hydraulic pressures impressed on the valve are controllably divided thereby to exert gauged pressure on the ram through the ram conduit and to dissipate the remaining pressures, generated by the pump, through the by-pass conduit 52 and the branch 54 thereof. Control valves other than the type described may be employed but the form shown possesses obvious advantages over conventional valves.

The operation of the hydraulic system of the first form of the present invention is clearly apparent from the preceding description and is briefly summarized at this point, particular reference being had to Fig. 7. During normal operation of the carry-all of the present invention, the cut-off valve 51 is closed and the two-way valve 56 positioned to employ the by-pass conduit 52, as a fluid return to the reservoir. The pump is motivated by rolling action of a wheel of the carry-all over terrain traversed and hydraulic fluid under pressure supplied to the valve 44. The valve core 57 is longitudinally positioned in the housing 46 impressing the selected pressure on the ram and by-passing the remainder of the fluid through the by-pass conduit 52 to the reservoir. When it is necessary to employ the hydraulic system when rolling action is not imparted to the wheels of the carry-all, the cut-off valve 51 is closed and the two-way valve 56 positioned so as to provide fluid communication between the valve 44 and the ram 29. When the system is so modified, the valve 44, as stated, becomes an emergency pump. The valve 51 being closed, the ram conduit 50 is sealed and no flow of fluid occurs therethrough. When the valve core is drawn upwardly, fluid is caused to flow through the conduits 42 and 43 into the housing 46. The check valves 45 preclude the return of the fluid through said conduits to the reservoir. When the valve 57 is forced downwardly hydraulic fluid previously drawn into the housing, having no other means of escape from the housing, is forced into the ram through the by-pass conduit 52 and branch 53. At the bottom of the stroke of the valve core, the check valve 55 in the branch of the by-pass conduit leading to the ram closes and no return flow of fluid occurs through said conduit. The plunger is reciprocated as frequently as desired to attain the desired extension of the ram. Attention is directed to the fact that this system is employed to utilize the valve 44 as a pump when the pump provided for normal operation fails due to inability to move the carry-all over the ground or for other causes. Thus, the present invention is not limited in its performance to hydraulic pressures derived from movement of the implement over the ground but successfully copes with emergency conditions such as those encountered when the carry-all and/or tractor becomes mired.

For purposes of clarity in description, means for the longitudinally positioning of the valve core 57 in the housing 46 has been delayed to this point. A valve stem 59 is connected to the plunger and extended from the housing. An operating arm 60 is pivotally connected to the support arm 18 adjacent the valve stem and upwardly extended from the housing. A pair of brackets 61 are preferably rigidly extended from the control arm on each side of the valve stem and have kidney slots 62 formed in the end portions thereof. A pin 63 is passed through the kidney slots and affixed to the upper end portion of the valve stem. As shown in Figs. 1, 2 and 3, a rope 64 is preferably attached to the upwardly extended end portion of the control arm and led forward to the tractor where the operator may conveniently exercise remote control of the hydraulic system. Inasmuch as the weight of the implement and load borne thereby tends to lower the frame, the hydraulic pressure within the system is sufficient to extend the valve stem from the support arms. By pulling on the rope, the tractor operator may control the flow of fluid to the ram at will. With the shut-off valve 51 closed and the two-way valve 56 positioned to direct the flow of hydraulic fluid through the by-pass conduit 52 and through its branch 53 communicating with the ram, successive pulls on the rope 64 reciprocally positions the valve core 57, the valve 44 operates as an emergency pump, and the earth working tools 16 are elevated, as desired.

Second form

A second form of the present invention is illustrated in Figs. 8, 9, 10, and 11. In the second form, the present invention is embodied in an implement other than an implement of the carry-all type, i. e. a disc harrow. The harrow has forward and rearward framed gangs of earth working tools 70 and 71, respectively. The forward gang 70 comprises a rectangular frame 72 having an axle 73 journaled longitudinally therein. Earth working tools, such as disc blades 74 are securely mounted on the axle 73 and as shown are concave toward the right according to the conventional practice. Ferrules or spacers 75 are interposed the disc blades and mounted on the axe 73 where they serve to maintain the disc blades in unitary relation spaced for efficient cultivating action. The rear gang 71 is of similar construction, having a rectangular frame 76, an axle 77 journaled longitudinally therein, disc blades 78 mounted on the axle, and spaced by ferrules 79. The disc blades on the rear gang are oppositely concaved to those of the front gang. A draft connection 80 is connected to the front gang as at 81 and to the rear gang as at 82.

The gangs are transversely disposed the normal direction of movement of the harrow and are pivotally interconnected as at 83 permitting relative angular adjustment of the gangs for cutting adjustment. For purposes of illustrating the present invention, only a conventional showing of the foregoing elements is made, but insofar as the invention is concerned the elements discussed may be of any type desired in which an earth working tool is rotated by rolling action over the ground when ground traversing action is imparted to the implement. In Fig. 1 the gangs are shown in angled, or cutting, position to which they tend to drag when drawn over the ground. In Fig. 2 the gangs are schematically shown in closed position as employed for the transporting of the disc and in other situations in which it is desired to minimize the cutting action of the discs. As employed in this second form, the present invention is directed to the controlled angling of the gangs in opposition to their tendency to open when drawn over the ground.

A substantially fluid tight housing 84, similar to the support arms of the first form of the present invention, is mounted on the front framed gang 70 circumjacent the axle 73. Inasmuch as the housing 84 is not required to pivot as the support arms 18 of the first form of the invention, it is conveniently, rigidly secured to the front frame 72. A cam 85 is fixedly mounted on the axle 73 within the housing. A pump lever 86 is pivotally mounted in the housing and has a yoke 87 formed in the extended end portion thereof in containing relation to the cam. As the disc blades 74 roll over the ground, they rotate the axle 73 which in turn rotates the cam 85 resulting in pivotal oscillating movement on the part of the pump lever, similar to the movement of the pump lever 32 of the first form. A pump comprising a cylinder 88 having a longitudinal bore, intake ports 89 and exhaust ports 90 at each end of the cylinder, and a plunger 91 slidably fitted in the bore of the cylinder is mounted in the housing adjacent the pump lever. The plunger is reciprocated in the cylinder by oscillatory motion of the pump lever in the manner described in the first form by a stud 92 mounted on the pump lever, passed through an opening 93 in the side of the cylinder and engaged to the plunger by being received by a circumscribing groove 94 formed therein. Intake conduits 94 having check valves 95 therein extend from the intake ports downwardly within the housing. A reservoir of hydraulic fluid 96 is provided in the housing covering the downwardly disposed end portions of the intake conduits. Fluid supply conduits 97, having check valves 98 provided therein, extend from the exhaust ports to a valve member 99.

The valve member 99 is of a conventional four-way type and is not described in detail at this point. Suffice it to say that the four-way valve has a fluid inlet 100, to which the supply conduit is connected, a by-pass outlet 101, and a pair of control ports 102 and 103, respectively. A valve core 104 is reciprocally positioned within the valve member by a valve stem 105 extended therefrom which serves to regulate the hydraulic pressures exerted through the by-pass outlet 101 and the control ports 102 and 103, as desired. It is to be understood that valves of other structure providing controlled flow of hydraulic fluid therefrom may be employed without departing from the spirit of the present invention. The valve stem 105 is manipulated by a control means 106 pivotally mounted on the housing, similar to the control means already described in the first form. A rope 107 similarly provides remote control of the valve.

A conventional two-way ram 108 is interconnected the forward and the rearwardly framed gangs 70 and 71, respectively, at positions offset from the pivotal interconnection 83 of the gangs. A ram conduit 109 interconnects one end of the ram with the control port 102. A second ram conduit 110 interconnects the other end of the ram with the control port 103. A bleeding conduit 111 is connected to the by-pass outlet 101 and provides a return passage for hydraulic fluid to the reservoir.

Figure 11:
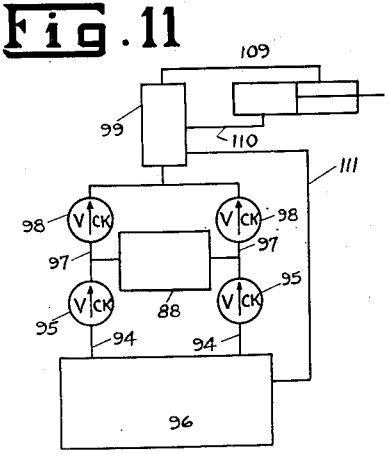
Fig. 11 is a schematic view of the hydraulic control system of a second form of the present invention employed in the harrow illustrated in Fig. 8.

The hydraulic system of the second form of the present invention is schematically illustrated in Fig. 11. As the discs roll over the ground, the pump is motivated as described and hydraulic fluid under pressure is delivered to the valve member 99. Reciprocal positioning of the valve core 104 regulates the pressures imposed at each end of the ram. When the pressure is increased on the ram through the conduit 109, the conduit 110 permits the bleeding of the opposite end of the ram through the valve and the conduit 111 back to reservoir. When the valve core is positioned to increase the hydraulic pressure imposed on the ram through the conduit 110, the conduit 109 permits the opposite end of the ram to bleed back through the valve and the conduit 111. Positive contraction and extension of the ram 108, as described, provides positive control of the angular relation of the forward and rearward framed gangs.

As in the first form of the present invention, the second form is not limited to the specific agricultural implement by which the invention is illustrated. In their adaptability to implements of various types, the forms of the present invention make the advantages of hydraulic control generally available. Being motivated by rolling action of elements of the implements over terrain traversed, the systems are employed independent of the draft appliance drawing the implements and thus are not limited to tractors having hydraulic pumps. Improved elements and arrangements thereof in the hydraulic systems of the present invention make possible, simple, economical, and dependable agricultural implements having hydraulic control, conveniently embodied in new implements and expeditiously incorporated in conventional implements.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices.

Having described my invention what I claim as new and desire to secure by Letters Patent is:

1. In an agricultural implement having as a part thereof an element rotated by rolling movement over the ground, a cam rotated by the rotation of said element, a pump lever pivotally mounted in the implement and engaged with the cam whereby rotation of the cam oscillatively pivots the pump lever, a fluid filled pump borne by the implement adjacent the pump lever and having a plunger as an element thereof motivated in pumping action by the oscillative pivoting of the pump lever, a fluid filled ram mounted in the implement in position controlling relation to portions thereof, fluid filled conduits communicating between the ram and the pump, and valve means in the conduits whereby fluid pressure generated by the pump is controllably impressed on the ram to spacially position said portions of the implement.

2. In an agricultural implement having spacially adjustable portions and an element rotated by rolling movement over the ground; a cam rotated by rotation of said element; a fluid filled pump mounted on the implement adjacent to the cam and having a plunger as an element thereof; a pump lever pivotally mounted on the implement, in communication with the plunger, and having a yoke portion containing the cam whereby cam rotation is translated into pivotal oscillation of the pump lever and responsive reciprocation of the plunger; a fluid filled ram mounted on a portion of the implement and interconnecting said portion and a second portion of the implement spacially adjustable in relation to the portion on which the cylinder is mounted; fluid filled conduits communicating between the pump and ram; and valve means positioned in the conduits and regulating the pressures exerted on the ram.

3. In a carry-all adapted to be drawn over the earth by a draft appliance, a forwardly movable frame, a pair of support wheels journaled in the frame and rotated by ground engagement as the carry-all is caused to traverse the earth, a tool bar, tool bar mounting means borne by the frame, a cam rotated by rotation of a wheel of the carry-all, a pump borne by the frame, means interconnecting the cam and the pump and translating rotation of said cam into motivation of the pump, a ram interconnecting the frame and the tool bar mounting means and raising and lowering said tool bar in response to contraction and extension of said ram, conduits communicating between the pump and opposite ends of the ram, and valve means in the conduits regulating the relative pressure imposed on opposite ends of the ram to extend and contract the same.

EINAR COOK.

References Cited in the file of this patent

UNITED STATES PATENTS

| Number | Name | Date |
|---|---|---|
| 1,223,741 | Schwister | Apr. 24, 1917 |
| 1,525,335 | Sutfin | Feb. 3, 1925 |
| 1,704,339 | Ray | Mar. 5, 1929 |
| 1,718,638 | Dirschauer | June 25, 1929 |
| 1,931,815 | Conley | Oct. 24, 1933 |
| 2,071,781 | Douglas | Feb. 23, 1937 |
| 2,237,884 | Lysedahl | Apr. 8, 1941 |
| 2,303,320 | Benjamin et al. | Dec. 1, 1942 |
| 2,337,510 | Trevaskis | Dec. 21, 1943 |
| 2,337,773 | Scarlett et al. | Dec. 28, 1943 |
| 2,363,119 | Crossman | Nov. 21, 1944 |
| 2,394,117 | Strandlund | Feb. 5, 1946 |
| 2,407,094 | Morkoski | Sept. 3, 1946 |

FOREIGN PATENTS

| Number | Country | Date |
|---|---|---|
| 105,748 | Australia | Nov. 17, 1938 |